United States Patent
Izumi et al.

(10) Patent No.: US 9,912,150 B2
(45) Date of Patent: Mar. 6, 2018

(54) POWER CONTROL SYSTEM

(71) Applicant: Mitsubishi Electric Corporation, Chiyoda-ku (JP)

(72) Inventors: Kikuo Izumi, Chiyoda-ku (JP); Tatsuya Okuda, Chiyoda-ku (JP); Tsutomu Shimazaki, Chiyoda-ku (JP); Naohide Tsuchimoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 258 days.

(21) Appl. No.: 14/784,148

(22) PCT Filed: May 21, 2014

(86) PCT No.: PCT/JP2014/063471
§ 371 (c)(1),
(2) Date: Oct. 13, 2015

(87) PCT Pub. No.: WO2015/004999
PCT Pub. Date: Jan. 15, 2015

(65) Prior Publication Data
US 2016/0072281 A1  Mar. 10, 2016

(30) Foreign Application Priority Data

Jul. 10, 2013 (JP) .................................. 2013-144344

(51) Int. Cl.
*G05B 15/02* (2006.01)
*H02J 1/00* (2006.01)
(Continued)

(52) U.S. Cl.
CPC ................ *H02J 1/00* (2013.01); *G05B 15/02* (2013.01); *H02J 3/32* (2013.01); *H02J 3/381* (2013.01);
(Continued)

(58) Field of Classification Search
CPC ...... H02J 1/00; H02J 3/32; H02J 3/381; H02J 7/34; H02J 7/35; H02J 9/00; G05B 15/02; Y02E 70/30
See application file for complete search history.

(56) References Cited

U.S. PATENT DOCUMENTS

| 6,198,178 B1 * | 3/2001 | Schienbein | H02M 7/49 |
| | | | 307/82 |
| 6,311,137 B1 * | 10/2001 | Kurokami | H02J 3/383 |
| | | | 363/74 |

(Continued)

FOREIGN PATENT DOCUMENTS

| JP | 2011 254696 | 12/2011 |
| JP | 2012 10502 | 1/2012 |
| JP | 2012 200060 | 10/2012 |

OTHER PUBLICATIONS

International Search Report dated Jul. 8, 2014, in PCT/JP2014/063471 filed May 21, 2014.

*Primary Examiner* — Mark Connolly
(74) *Attorney, Agent, or Firm* — Oblon, McClelland, Maier & Neustadt, L.L.P.

(57) ABSTRACT

In a power control system which connects power from the power storage device to a power grid and supplies power to a load, the power from the power storage device is connected to the load and the power grid via a DC/DC converter, a smoothing capacitor, and a DC/AC converter. By a first power control unit for controlling flow power of the power grid to be a power command value, and by a second power control unit for suppressing reverse flow power, an output power command for the DC/AC converter is generated, an output power command for the DC/DC converter is generated so that voltage of the smoothing capacitor becomes target voltage, and the output power command is corrected so as to suppress voltage variation in the smoothing capacitor.

16 Claims, 8 Drawing Sheets

(51) Int. Cl.
    *H02J 7/34*     (2006.01)
    *H02J 9/00*     (2006.01)
    *H02J 5/00*     (2016.01)
    *H02J 7/02*     (2016.01)
    *H02J 3/32*     (2006.01)
    *H02J 3/38*     (2006.01)
    H02J 7/35     (2006.01)

(52) U.S. Cl.
    CPC ............... *H02J 5/00* (2013.01); *H02J 7/02* (2013.01); *H02J 7/34* (2013.01); *H02J 9/00* (2013.01); *H02J 7/35* (2013.01); *Y02E 70/30* (2013.01)

(56) References Cited

U.S. PATENT DOCUMENTS

| | | | | |
|---|---|---|---|---|
| 6,330,170 | B1 * | 12/2001 | Wang | H02J 9/062 363/17 |
| 6,949,843 | B2 * | 9/2005 | Dubovsky | H02J 3/382 307/64 |
| 9,537,319 | B2 * | 1/2017 | Parkhideh | H02J 3/38 |
| 2011/0291479 | A1 | 12/2011 | Lee | |
| 2014/0163762 | A1 * | 6/2014 | Nakamura | H02J 3/32 700/295 |

\* cited by examiner

POWER CONTROL SYSTEM

TECHNICAL FIELD

The present invention relates to a power control system connected to a power grid and controlling flow power of the power grid.

BACKGROUND ART

A conventional power control system connects a power generation system, a battery, and a power grid, and controls a power storage system which supplies power to a load. The control of the power storage system includes a step of determining whether or not the power grid is connected to the load, and a step of determining whether or not power is generated by the power generation system, and operation is performed in one of a plurality of operation modes of the power storage system, based on a determination result of at least one of the generated power amount of the power generation system, a charge status of the battery, a charged power amount of the battery, a power consumption amount of the load, and time (for example, see Patent Document 1).

CITATION LIST

Patent Document

Patent Document 1: Japanese Laid-Open Patent Publication No. 2011-254696

SUMMARY OF THE INVENTION

Problems to be Solved by the Invention

In such a power control system, the power status of each section connected to the power grid is monitored, and the operation mode is changed in accordance with the monitoring information. Therefore, at the time of switching of the operation mode, stop of system operation is required or time lag occurs. Therefore, at the time of switching of the operation mode, instantaneous variation in the power status may occur. In this case, system operation cannot follow the instantaneous variation in the power status, and the operation status of the load or stability of the power grid may be influenced.

The present invention has been made to solve the above problem, and an object of the present invention is to cause a power storage device connected to a power grid to be charged or discharged, and control flow power of the power grid, without influencing the operation status of a load or stability of the power grid.

Solution to the Problems

A power control system according to the present invention includes: a DC/DC converter having a first input/output side connected to a power storage device and causing the power storage device to be charged or discharged through a bidirectional DC/DC power conversion operation; a DC/AC converter having a DC side connected to a second input/output side of the DC/DC converter and an AC side connected to a power grid, and performing bidirectional power conversion operation between DC and AC; a power smoothing element connected between the second input/output side of the DC/DC converter and the DC side of the DC/AC converter; a flow power detection unit for detecting flow power of the power grid; a reverse flow power detection unit for detecting reverse flow power flowing to the power grid, on the power grid side with respect to a load connected between the DC/AC converter and the power grid; and a control device for performing output control of the DC/DC converter and the DC/AC converter based on a command value for the flow power from the power grid, which is a given power command value, and on a result of detection by the flow power detection unit and the reverse flow power detection unit. The control device includes: a power control unit for generating a first output power command for the DC/AC converter, the power control unit including a first power control unit for controlling the flow power from the power grid so as to follow the power command value, and a second power control unit for controlling the reverse flow power so as to be suppressed; a first voltage control unit for generating a second output power command for the DC/DC converter so that voltage of the power smoothing element becomes target voltage; and a second voltage control unit for correcting the first output power command so as to suppress voltage variation in the power smoothing element.

Effect of the Invention

The power control system of the present invention can cause the power storage device to be charged or discharged, and reliably control flow power of the power grid, without influencing the operation status of the load or stability of the power grid.

DESCRIPTION OF EMBODIMENTS

Embodiment 1

Figure 1:
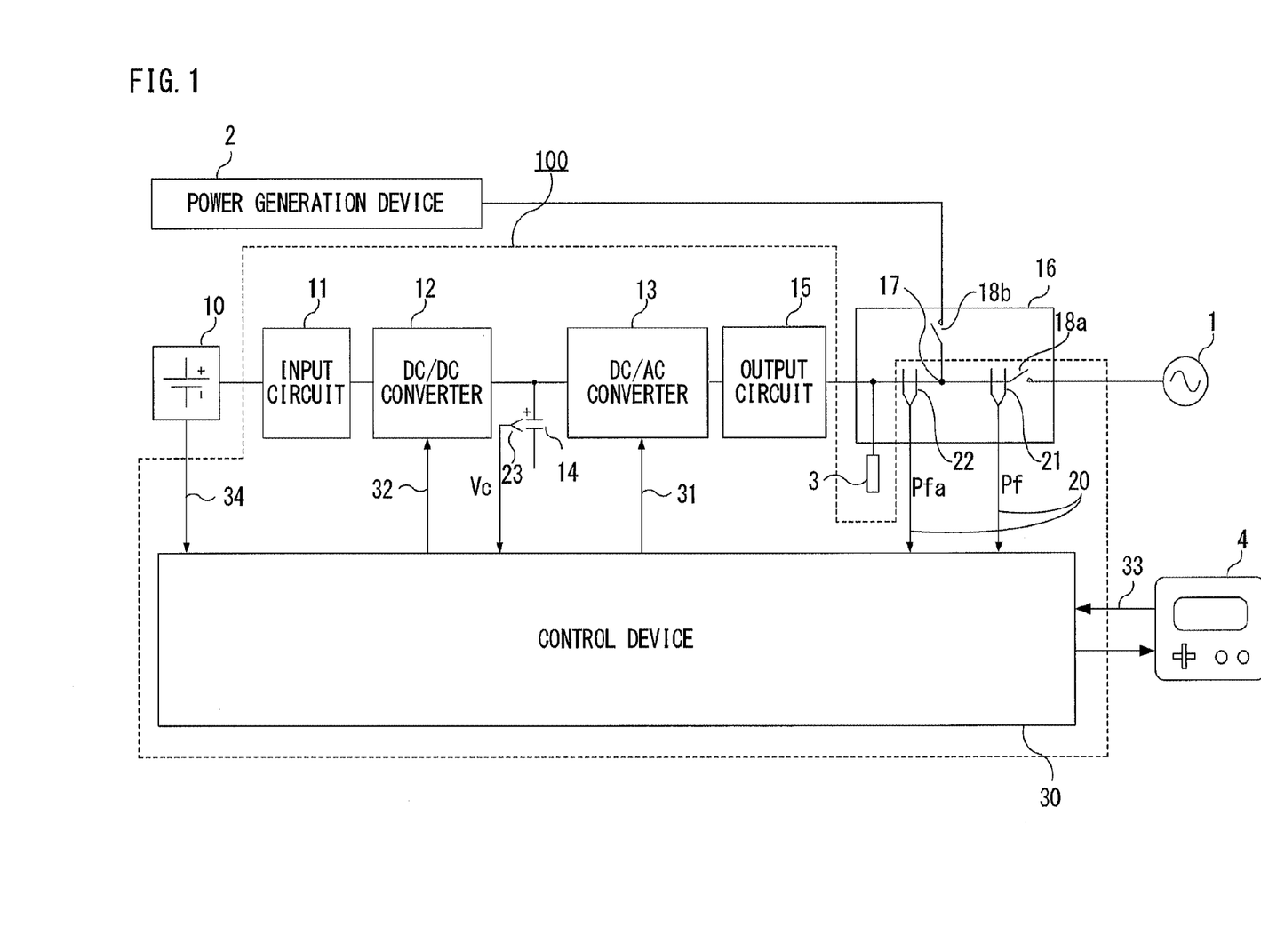
FIG. 1 is a diagram showing the schematic configuration of a power control system according to embodiment 1 of the present invention.

FIG. 1 is a diagram showing the schematic configuration of a power control system according to embodiment 1 of the present invention. A power control system 100 includes: an input circuit 11 for connecting a DC/DC converter 12 described later to a power storage device 10; a DC/DC converter 12 having a first input/output side connected to the power storage device 10 via the input circuit 11; a DC/AC converter 13 having a DC side connected to a second input/output side of the DC/DC converter 12; a smoothing capacitor 14 as a power smoothing element, connected between the second input/output side of the DC/DC converter 12 and the DC side of the DC/AC converter 13; and an output circuit 15 for connecting an AC side of the DC/AC converter 13 to a power grid 1. The output circuit 15 is connected to a distribution board 16 for making connection to the power grid. A load 3 is connected to the power grid 1, and a power generation device 2 such as a solar battery is connected to the power grid 1. AC output of the DC/AC converter 13 via the output circuit 15, the power grid 1, the load 3, and the power generation device 2 are connected by the distribution board 16.

In addition, the power control system 100 includes a control device 30 for controlling the DC/DC converter 12 and the DC/AC converter 13. Further, the power control system 100 includes: a flow power detection unit 21 and a reverse flow power detection unit 22 for detecting power flow information 20; and a voltage sensor 23 for detecting voltage Vc of the smoothing capacitor 14.

The DC/DC converter 12 causes the power storage device 10 to be charged or discharged through bidirectional DC/DC power conversion operation. The DC/AC converter 13, with its DC side connected to the DC/DC converter 12 and its AC side connected to the power grid 1, performs bidirectional power conversion operation between DC and AC.

In the distribution board 16, the flow power detection unit 21 and the reverse flow power detection unit 22 are provided, and switches 18a and 18b are provided for switching the state of connection among AC output of the DC/AC converter 13, the power grid 1, the load 3, and the power generation device 2.

The flow power detection unit 21 detects flow power Pf of the power grid 1. The reverse flow power detection unit 22 is provided on the power grid 1 side with respect to the load 3 connected between the output circuit 15 and the power grid 1, and detects reverse flow power Pfa flowing to the power grid 1. Generated power of the power generation device 2 is interconnected to the power grid 1, on the power grid 1 side with respect to the reverse flow power detection unit 22.

Therefore, the reverse flow power Pfa detected by the reverse flow power detection unit 22 is discharge power of the power storage device 10 flowing to the power grid 1. When generated power from the power generation device 2 is supplied, i.e., sold to the power grid 1 side, the flow power detection unit 21 detects sale power.

The control device 30 receives a power command value 33 from a superior control device 4 as a command value generating unit, and generates and outputs an output power command (after correction) 31 as a first output power command for the DC/AC converter 13, and an output power command 32 as a second output power command for the DC/DC converter 12, based on the power flow information 20 including the flow power Pf from the flow power detection unit 21 and the reverse flow power Pfa from the reverse flow power detection unit 22, voltage Vc of the smoothing capacitor 14 from the voltage sensor 23, and information 34 from the power storage device 10.

Since voltage variation in the smoothing capacitor 14 influences breakdown voltage design of an element composing each section, it is preferable that the voltage of the smoothing capacitor 14 is controlled to be constant. Therefore, the control device 30 controls the flow power Pf of the power grid 1, and controls the voltage Vc of the smoothing capacitor 14.

Instead of receiving the power command value 33 from the superior control device 4, a power command value 33 included in the control device 30 may be used.

Hereinafter, the configuration and operation of the control device 30 will be described based on FIG. 2.

Figure 2:
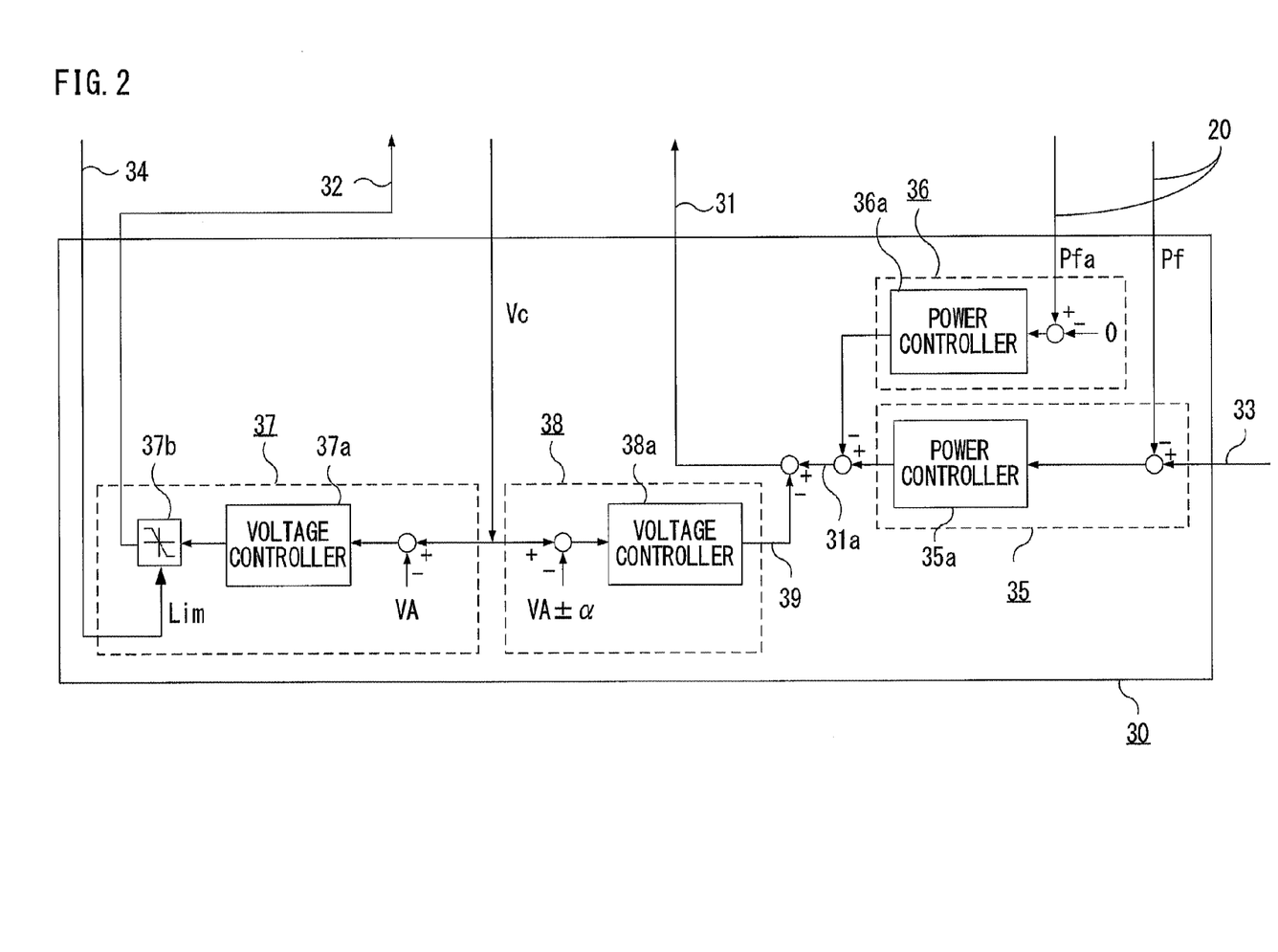
FIG. 2 is a diagram showing the configuration of a control device of the power control system according to embodiment 1 of the present invention.

As shown in FIG. 2, the control device 30 includes: a first power control unit 35 for controlling the flow power Pf of the power grid 1 so as to follow the power command value 33; a second power control unit 36 for performing control to suppress the reverse flow power Pfa; a first voltage control unit 37 for performing control so that the voltage Vc of the smoothing capacitor 14 becomes a set target voltage VA; and a second voltage control unit 38 for suppressing voltage variation in the smoothing capacitor 14.

In this case, a power direction in which the power storage device 10 is discharged and a power direction in which power is outputted (sold) to the power grid 1 are assumed to be positive.

The first power control unit 35 includes a power controller 35a, and outputs a control command by calculation such as PI control so that the flow power Pf detected by the flow power detection unit 21 follows the power command value 33. The second power control unit 36 includes a power controller 36a, and outputs a control command by calculation such as PI control so as to suppress the reverse flow power Pfa detected by the reverse flow power detection unit 22. Based on the control command from the first power control unit 35 and the control command from the second power control unit 36, an output power command (before correction) 31a is generated as the first output power command for the DC/AC converter 13.

In the case where the reverse flow power Pfa is equal to or smaller than zero, the control command from the first power control unit 35 is used as the output power command 31a.

The voltage Vc (capacitor voltage Vc) of the smoothing capacitor 14 detected by the voltage sensor 23 is inputted to the first voltage control unit 37 and the second voltage control unit 38. In the first voltage control unit 37, a voltage controller 37a and a limiter 37b are provided, and the voltage controller 37a outputs a control command by calculation such as PI control so that the capacitor voltage Vc follows the target voltage VA. The control command from the voltage controller 37a is limited by the limiter 37b, and then outputted as the output power command 32 for the DC/DC converter 12. The limiter 37b limits the control command from the voltage controller 37a, by a limit value Lim which is the information 34 from the power storage device 10, or the like.

The second voltage control unit 38 includes a voltage controller 38a, and outputs a correction value 39 for correcting the output power command 31a for the DC/AC converter 13, by using two kinds of reference voltages of an upper limit voltage (VA+α) which is higher than the target voltage VA by predetermined voltage α and a lower limit voltage (VA−α) which is lower than the target voltage VA by the predetermined voltage α, with respect to the capacitor voltage Vc.

That is, when the capacitor voltage Vc exceeds the upper limit voltage (VA+α), the voltage controller 38a calculates the correction value 39 through PI control or the like so that the capacitor voltage Vc becomes equal to or smaller than the upper limit voltage (VA+α). When the capacitor voltage Vc becomes smaller than the lower limit voltage (VA−α), the voltage controller 38a calculates the correction value 39 through PI control or the like so that the capacitor voltage Vc becomes equal to or greater than the lower limit voltage (VA−α).

Then, the output power command 31a is corrected by the correction value 39, and the corrected output power command 31 controls the DC/AC converter 13.

Next, constraint conditions for operation of the power control system 100 will be described below.

A first constraint condition is that discharge power from the power storage device 10 must not flow to the power grid 1.

A second constraint condition is that, when the power storage device 10 is charged, purchase power from the power grid 1 must not exceed a predetermined value.

A third constraint condition is that, depending on the status of each device (the power storage device 10, the DC/DC converter 12, the DC/AC converter 13), their output powers are suppressed at respective timings.

The first constraint condition is a condition that should be satisfied by all power control systems to which the power storage device is connected and which is connected to the power grid 1. The second constraint condition depends on, for example, a current carrying capacity of a contracted breaker in a general home, which is placed at the distribution board 16 or to the power grid 1 side with respect to the distribution board 16. The power control system 100 has a constraint condition that such an operation that purchase power exceeds the current carrying capacity of the contracted breaker must not be performed. The third constraint condition is a constraint condition determined by each device status of the power storage device 10, the DC/DC converter 12, and the DC/AC converter 13, e.g., the remaining amount of accumulated power or an operation temperature.

While satisfying the first to third constraint conditions, the control device 30 performs output control of the DC/DC converter 12 and the DC/AC converter 13 so as to cause the flow power Pf to follow the power command value 33, suppress the reverse flow power Pfa, and control the capacitor voltage Vc to be the target voltage VA. When the capacitor voltage Vc exceeds the upper limit voltage (VA+α) or becomes smaller than the lower limit voltage (VA−α), the control device 30 corrects the output power command 31 for the DC/AC converter 13, to suppress voltage variation in the capacitor voltage Vc.

Even if the power command value 33 changes, the control device 30 performs the same control operation as described above. Thus, in accordance with the power command value 33, the output power command 31 for the DC/AC converter 13 and the output power command 32 for the DC/DC converter 12 are changed, and the power control system 100 operates so as to automatically switch among a plurality of operation modes shown below.

In the case where the respective sections in the power control system 100 are in a stable state, the flow power Pf of the power grid 1 is controlled to be the power command value 33, output power of the DC/DC converter 12 and output power of the DC/AC converter 13 are equal to each other, and the capacitor voltage Vc becomes constant.

First, a charge priority mode which is a first operation mode will be described below.

Figure 3:
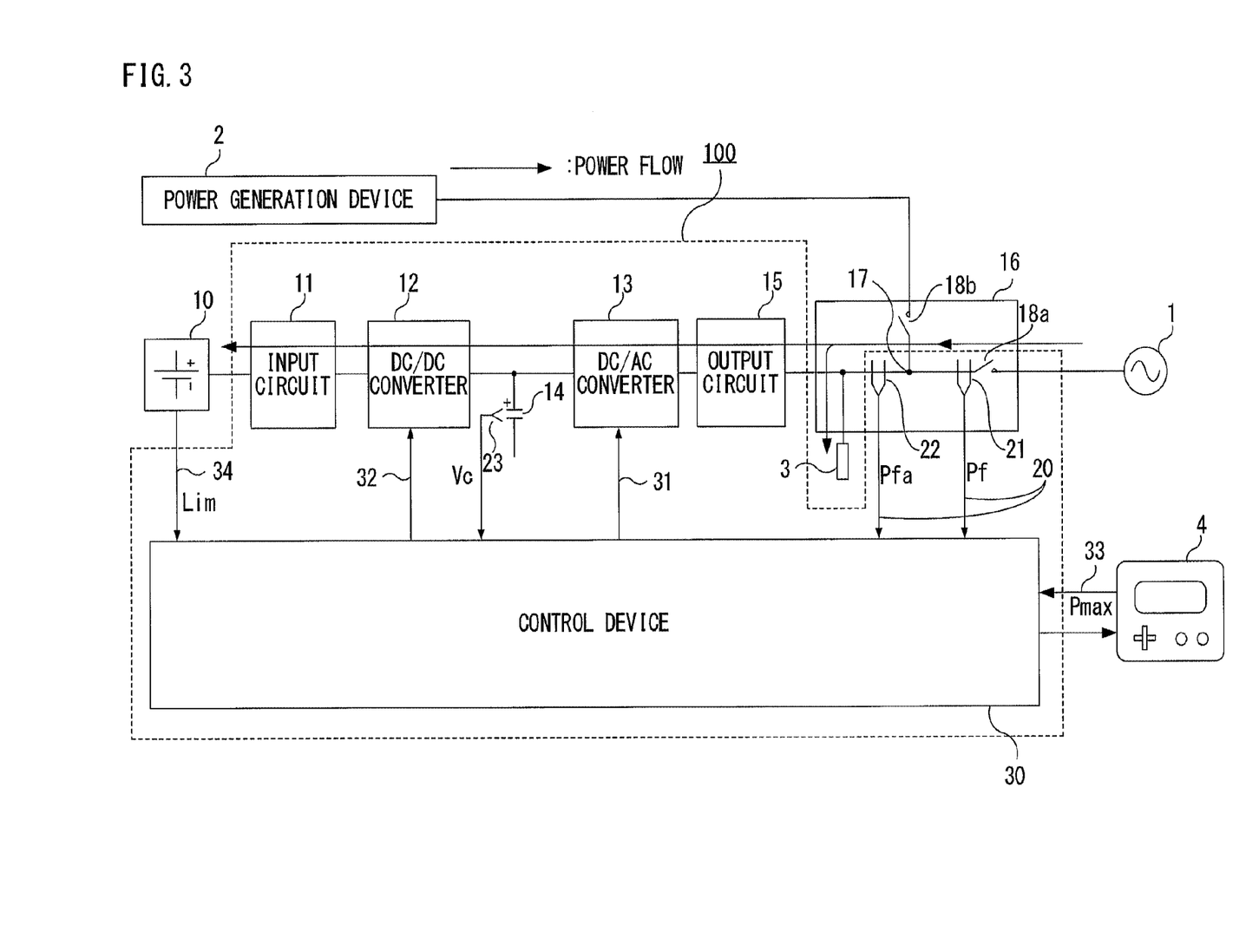
FIG. 3 is a diagram showing a power flow state in a charge priority mode according to embodiment 1 of the present invention.
Figure 4:
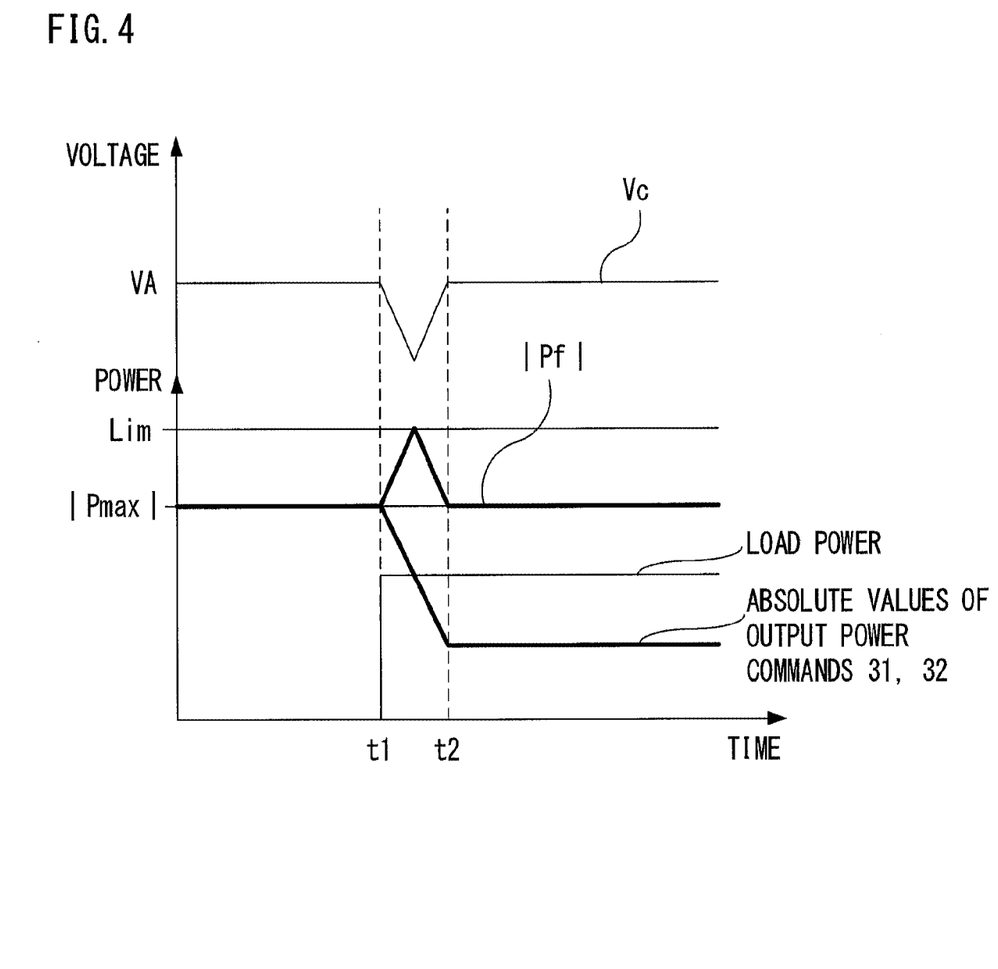
FIG. 4 is an explanation diagram showing a waveform at each section in the charge priority mode according to embodiment 1 of the present invention.

FIG. 3 is a diagram showing an example of a power flow state in the charge priority mode. In FIG. 3, it is assumed that the power generation device 2 is not generating power. FIG. 4 is a waveform diagram at each section, showing an example of the power status in the charge priority mode.

In the charge priority mode, a purchase power maximum value Pmax is set as the power command value 33. The purchase power maximum value Pmax is determined based on the second constraint condition described above, and thus is determined based on the current carrying capacity of the contracted breaker, or the like. However, the purchase power maximum value Pmax may be set by a user so as not to exceed the current carrying capacity of the contracted breaker.

Since a power direction in which power is sold is positive, in this case, the purchase power maximum value Pmax becomes a negative value.

As shown in FIG. 3, the flow power Pf of the power grid 1 is supplied as load power to the load 3, and the rest of the power is charged in the power storage device 10.

First, the first power control unit 35 outputs a control command which is basic information of the output power command 31 for the DC/AC converter 13 so that (purchase power maximum value−actual purchase power), i.e., (Pmax−Pf), which is a value obtained by subtracting actual purchase power which is the flow power Pf detected by the flow power detection unit 21 from the purchase power maximum value Pmax which is the power command value 33, becomes zero. For example, in the case of (|Pmax|>|Pf|), the magnitude of the control command is increased so as to increase charge power to the power storage device 10. On the other hand, in the case of (|Pmax|<|Pf|), the magnitude of the control command is decreased so as to decrease charge power to the power storage device 10.

As a result, the first power control unit 35 outputs the control command represented by —(|Pmax|−load power).

In the case where the reverse flow power Pfa is equal to or smaller than zero and the voltage Vc of the smoothing capacitor 14 is within a range from the lower limit voltage to the upper limit voltage, the control command from the first power control unit 35 directly becomes the output power command 31 for the DC/AC converter 13. Then, the DC/AC converter 13 outputs (|Pmax|−load power) to the DC side. Since a power direction in which the power storage device 10 is discharged is positive, the output power command 31 corresponds to output of the DC/AC converter 13 to the AC side, and the output power command 32 corresponds to output of the DC/DC converter 12 to the smoothing capacitor 14 side.

The first voltage control unit 37 generates the output power command 32 for the DC/DC converter 12 so that the voltage Vc of the smoothing capacitor 14 becomes the target voltage VA. As a result, the output power command 32 for the DC/DC converter 12 becomes equal to the output power command 31 for the DC/AC converter 13, and thus becomes —(|Pmax|−load power). At this time, output power of the DC/DC converter 12 and output power of the DC/AC converter 13 are equal to each other, and the capacitor voltage Vc is controlled to be constant at the target voltage VA.

When the DC/AC converter 13 outputs (|Pmax|−load power) to the DC side, the magnitude of purchase power is as follows:

$$|\text{Purchase power}| = \text{load power} + \begin{pmatrix} \text{output power of AC/DC} \\ \text{converter 13 to DC side} \end{pmatrix}$$

$$= \text{load power} + (|P\text{max}| - \text{load power})$$

$$= |P\text{max}|.$$

Thus, even if load power varies, actual purchase power (detected flow power Pf) can be controlled to be equal to the purchase power maximum value Pmax which is the power command value 33, and the second constraint condition can also be satisfied.

Here, the case where load power varies as shown in FIG. 4, for example, will be described below. In this case, the detected flow power Pf, the purchase power maximum value Pmax, and the output power commands 31 and 32 are negative values, but in FIG. 4, the magnitude of power is shown, using an absolute value.

In a stable state in which load power is zero and actual purchase power (flow power Pf) is controlled to be the purchase power maximum value Pmax which is the power command value 33, the output power commands 31 and 32 for the DC/AC converter 13 and the DC/DC converter 12 are both equal to the purchase power maximum value Pmax. At this time, the voltage Vc of the smoothing capacitor 14 is also controlled to be constant at the target voltage VA. Power of |Pmax| is charged in the power storage device 10.

At time t1, when predetermined load power occurs, the magnitude of actual purchase power which is the flow power Pf of the power grid 1, that is, |Pf| increases. The first power control unit 35 reduces the output power command (absolute value) for the DC/AC converter 13 so that |Pf| does not exceed |Pmax|. As a result, the voltage Vc of the smoothing capacitor 14 connected to output of the DC/AC converter 13 reduces due to an output power difference between the DC/AC converter 13 and the DC/DC converter 12. The first voltage control unit 37 reduces the output power command 32 (absolute value) for the DC/DC converter 12 so that the reduced capacitor voltage Vc becomes the target voltage VA.

Thus, the output power commands 31 and 32 (absolute values) for the DC/AC converter 13 and the DC/DC converter 12 both reduce to be equal to (|Pmax|−load power), actual purchase power (flow power Pf) returns to the purchase power maximum value Pmax which is the power command value 33, and the capacitor voltage Vc also returns to the target voltage VA (time t2).

For convenience sake, in FIG. 4, actual purchase power (flow power Pf), the capacitor voltage Vc, the output power command 31 for the DC/AC converter 13, and the output power command 32 for the DC/DC converter 12 are shown so as to synchronously change at time t1 when load power changes, but as described above, they respectively vary at different timings.

By such control, the capacitor voltage Vc can be prevented from deviating from a normal range, and power control can be performed in such a manner that the output power commands 31 and 32 for the DC/AC converter 13 and the DC/DC converter 12 are smoothly changed without influencing the breakdown voltage of an element composing each section of a main circuit in the power control system 100.

In the charge priority mode, generally, charge power to the power storage device 10 is set to be great in order to rapidly charge the power storage device 10. However, if the power storage device 10 is charged with excessive power, deterioration in the power storage device 10 may be caused, and as a requirement in the power storage device 10, it is preferable that, in the vicinity of full charge, charging control should be performed with comparatively low current. Therefore, as the third constraint condition, the limit value Lim is set for charge/discharge power of the power storage device 10.

Hereinafter, the case where charge power to the power storage device 10 is limited to the limit value Lim in the charge priority mode will be described.

The limit value Lim set for the power storage device 10 is inputted to the control device 30 as the information 34 from the power storage device 10. When the magnitude of the control command outputted from the voltage controller 37a of the first voltage control unit 37 is equal to or smaller than the limit value Lim, the control command directly becomes the output power command 32 for the DC/DC converter 12. When output power of the DC/AC converter 13 to the DC side increases, the voltage Vc of the smoothing capacitor 14 also increases, and the magnitude of the control command outputted from the voltage controller 37a exceeds the limit value Lim, the magnitude of the output power command 32 is limited to the limit value Lim by the limiter 37b. As a result, output power of the DC/AC converter 13 to the DC side becomes greater than output power of the DC/DC converter 12 to the DC side, and the voltage Vc of the smoothing capacitor 14 increases, but this cannot be suppressed by control of the first voltage control unit 37.

When the capacitor voltage Vc exceeds the upper limit voltage (VA+α), the second voltage control unit 38 calculates the correction value 39 so that the capacitor voltage Vc becomes equal to or smaller than the upper limit voltage (VA+α), thereby correcting the magnitude of the output power command 31 for the DC/AC converter 13 so as to be reduced. Thus, output power of the DC/AC converter 13 and output power of the DC/DC converter 12 can be made equal to each other, and the capacitor voltage Vc is controlled to be equal to or smaller than the upper limit voltage (VA+α).

Since the second voltage control unit 38 does not operate when the capacitor voltage Vc is within a range from the lower limit voltage (VA−α) to the upper limit voltage (VA+α), the second voltage control unit 38 does not influence control in the first voltage control unit 37.

By such control, the third constraint condition can also be satisfied and operation can be reliably continued.

Next, a purchase suppression mode which is a second operation mode will be described below.

Figure 5:
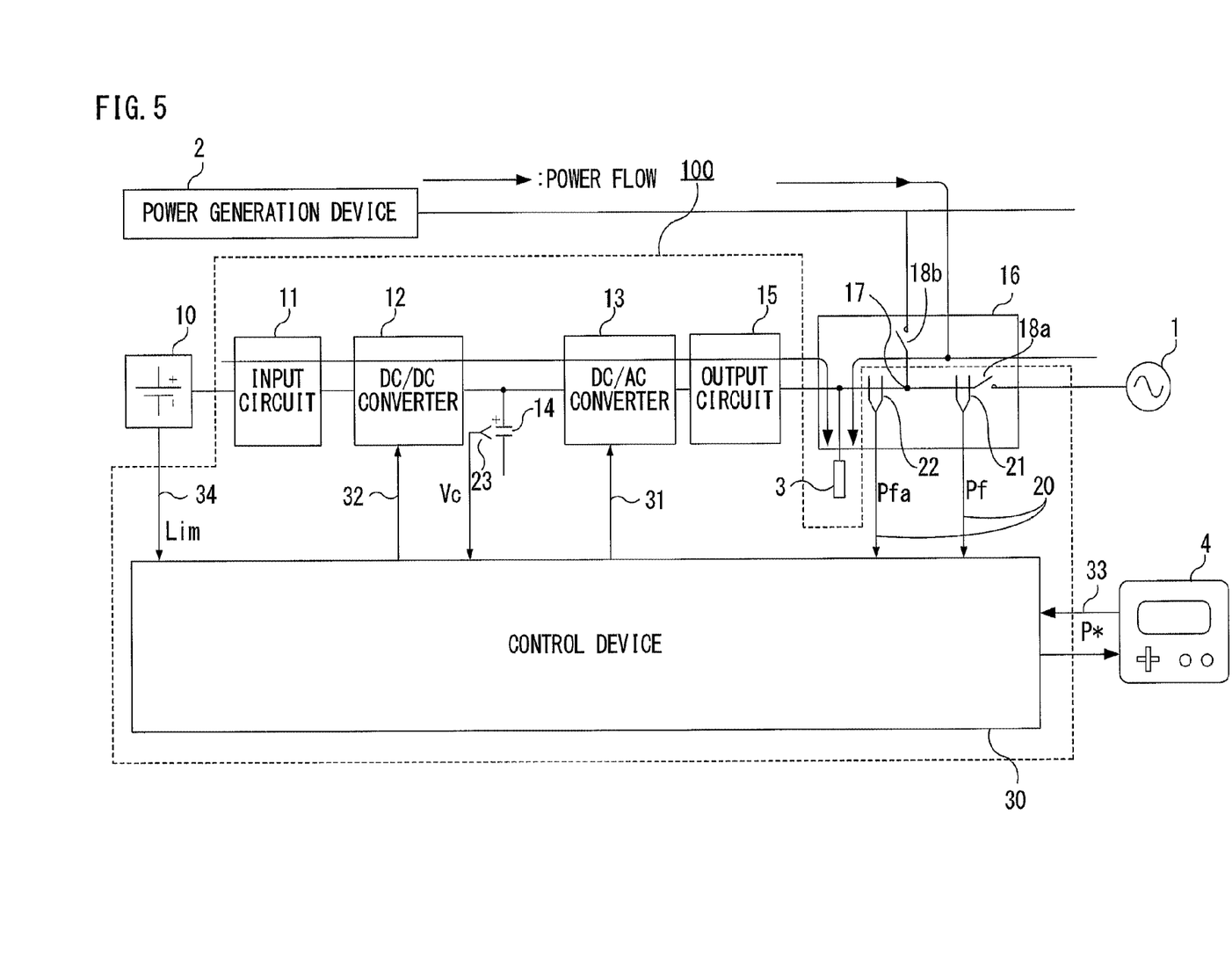
FIG. 5 is a diagram showing a power flow state in a purchase suppression mode according to embodiment 1 of the present invention.

FIG. 5 is a diagram showing an example of a power flow state in the purchase suppression mode. In this case, the power generation device 2 is generating power, as shown in FIG. 5, purchase power which is the flow power Pf of the power grid 1 and generated power from the power generation device 2 are supplied as load power to the load 3, and load power corresponding to deficiency is discharged from the power storage device 10. The power generation device 2 may not be generating power.

In the purchase suppression mode, a purchase power command value P* is set as the power command value 33 from the superior control device 4. The purchase power command value P* may be set by a user of the power control system 100.

Basic control of the control device 30 is the same as in the charge priority mode, that is, output control of the DC/DC converter 12 and the DC/AC converter 13 is performed so as to cause the flow power Pf to follow the power command value 33, suppress the reverse flow power Pfa, and control the capacitor voltage Vc to be the target voltage VA.

The first power control unit 35 outputs a control command which is basic information of the output power command 31 for the DC/AC converter 13 so that (purchase power command value−actual purchase power), i.e., (P*−Pf) becomes zero.

In the case where the reverse flow power Pfa is equal to or smaller than zero and the voltage Vc of the smoothing capacitor 14 is within a range from the lower limit voltage to the upper limit voltage, the control command from the first power control unit 35 directly becomes the output power command 31 for the DC/AC converter 13. As a result, the first power control unit 35 outputs the control command (output power command 31) represented by—(|P*|+generated power−load power).

The first voltage control unit 37 generates the output power command 32 for the DC/DC converter 12 so that the voltage Vc of the smoothing capacitor 14 becomes the target voltage VA. As a result, the output power command 32 for the DC/DC converter 12 becomes equal to the output power command 31 for the DC/AC converter 13, and thus becomes—(|P*|+generated power−load power). At this time, output power of the DC/DC converter 12 and output power of the DC/AC converter 13 are equal to each other, and the capacitor voltage Vc is controlled to be constant at the target voltage VA.

When values of the output power commands 31 and 32 for the DC/AC converter 13 and the DC/DC converter 12 are negative, the power storage device 10 is charged, and when values of the output power commands 31 and 32 for the DC/AC converter 13 and the DC/DC converter 12 are positive, the power storage device 10 is discharged. That is, depending on whether the polarity of—(|P*|+generated power−load power) is positive or negative, charge and discharge are automatically switched. In FIG. 5, —(|P*|+generated power−load power) is positive, the power storage device 10 is discharged, and power flows in the case where purchase power, generated power, and discharge power from the power storage device 10 are supplied to the load 3 are indicated by arrows.

By such control, the capacitor voltage Vc can be prevented from deviating from a normal range, and power control can be performed in such a manner that the output power commands 31 and 32 for the DC/AC converter 13 and the DC/DC converter 12 are smoothly changed without influencing the breakdown voltage of an element composing each section of a main circuit in the power control system 100.

Here, for example, the case where load power sharply reduces will be described below.

When load power sharply reduces, reverse flow power flows to the power grid 1 side with respect to the load 3, due to output power of the DC/AC converter 13. The second power control unit 36 outputs a control command so as to suppress the reverse flow power Pfa detected by the reverse flow power detection unit 22. By this control command, the output power command 31 for the DC/AC converter 13 decreases, and discharge power from the power storage device 10 is suppressed.

Thus, the reverse flow power Pfa can be suppressed by the second power control unit 36, and the first constraint condition can be satisfied.

If control response of the second power control unit 36 is set to be faster than control response of the first power control unit 35, it becomes possible to instantaneously suppress the reverse flow power Pfa and thus comply with the first constraint condition.

Hereinafter, the case where discharge power from the power storage device 10 is limited to the limit value Lim in the purchase suppression mode will be described.

In this case, the output power commands 31 and 32 for the DC/AC converter 13 and the DC/DC converter 12 are positive. When output power of the DC/AC converter 13 increases, the voltage Vc of the smoothing capacitor 14 also decreases, and the control command outputted from the voltage controller 37a of the first voltage control unit 37 increases to exceed the limit value Lim, the output power command 32 is limited to the limit value Lim by the limiter 37b. As a result, output power of the DC/AC converter 13 becomes greater than output power of the DC/DC converter 12, and the voltage Vc of the smoothing capacitor 14 decreases, but this cannot be suppressed by control of the first voltage control unit 37.

When the capacitor voltage Vc becomes smaller than the lower limit voltage (VA−α), the second voltage control unit 38 calculates the correction value 39 so that the capacitor voltage Vc becomes equal to or greater than the lower limit voltage (VA−α), thereby correcting the output power command 31 for the DC/AC converter 13 so as to be reduced. Thus, output power of the DC/AC converter 13 and output power of the DC/DC converter 12 can be made equal to each other, and the capacitor voltage Vc is controlled to be equal to or greater than the lower limit voltage (VA−α).

By such control, a discharge power limitation condition of the power storage device 10, which is a part of the third constraint condition, can also be satisfied, and operation can be reliably continued.

Figure 6:
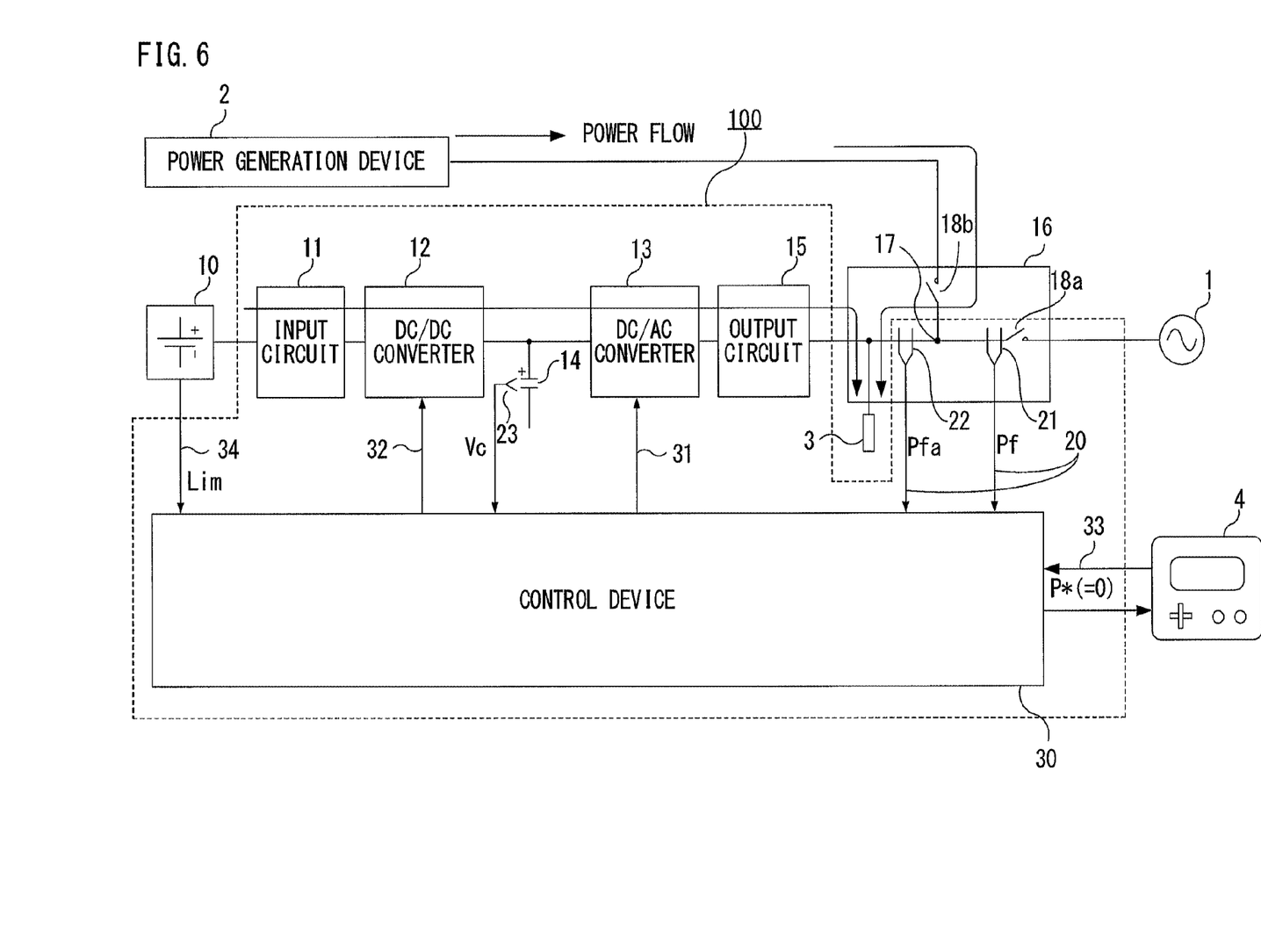
FIG. 6 is a diagram showing a power flow state in a purchase minimum mode according to embodiment 1 of the present invention.

Hereinafter, in the purchase suppression mode described above, particularly, a purchase minimum mode in which the purchase power command value P* as the power command value 33 is zero will be described. FIG. 6 is a diagram showing an example of a power flow state in the purchase minimum mode. As shown in FIG. 6, generated power from the power generation device 2 is supplied as load power to the load 3, and load power corresponding to deficiency is discharged from the power storage device 10. The control in this case corresponds to control in the purchase suppression mode in which the purchase power command value P* is set to zero.

In the purchase minimum mode, if generated power from the power generation device 2 is greater than load power, surplus power can be sold to the power grid 1 side. In this case, the first voltage control unit 37 forbids charging to the power storage device 10. Generated power from the power generation device 2 is supplied as load power to the load 3 and surplus power is sold to the power grid 1 side. If the load power is deficient, power is discharged from the power storage device 10.

Next, a sale maximum mode which is a third operation mode will be described below.

Figure 7:
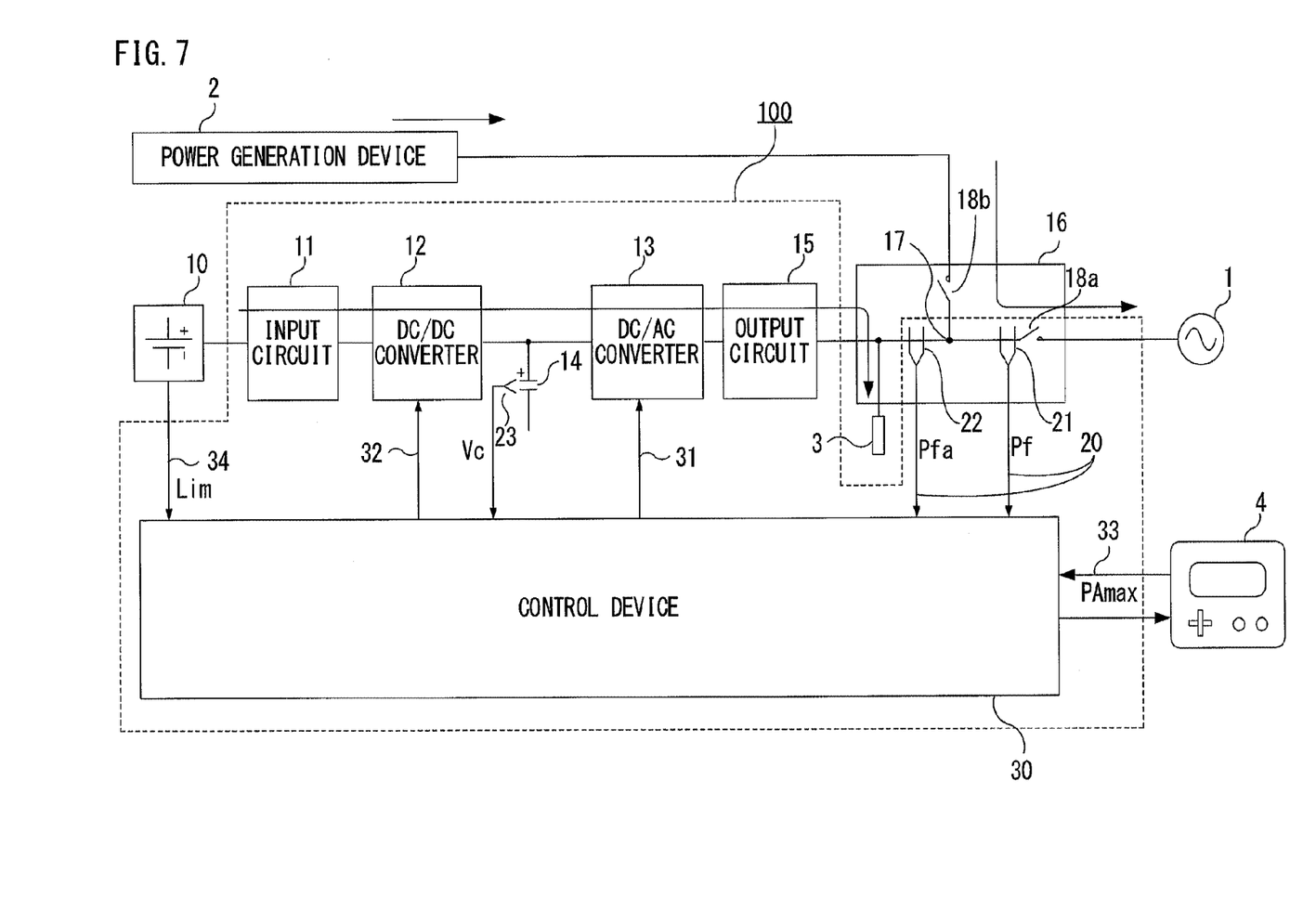
FIG. 7 is a diagram showing a power flow state in a sale maximum mode according to embodiment 1 of the present invention.

FIG. 7 is a diagram showing an example of a power flow state in the sale maximum mode. In this case, operation is performed such that as much generated power outputted from the power generation device 2 as possible reversely flows to the power grid 1 so as to be sold. As shown in FIG. 7, generated power from the power generation device 2 is supplied to the power grid 1, and discharge power from the power storage device 10 is supplied to the load 3.

In the sale maximum mode, a sale power maximum value PAmax is set as the power command value 33. The sale power maximum value PAmax, as in the case of charge priority mode, is determined based on the second constraint condition, and thus is determined based on the current carrying capacity of the contracted breaker, or the like, but may be set by a user. Since a power direction in which power is sold is positive, in this case, the sale power maximum value PAmax is a positive value.

Basic control of the control device 30 is the same as in the charge priority mode and the purchase suppression mode, that is, output control of the DC/DC converter 12 and the DC/AC converter 13 is performed so as to cause the flow power Pf to follow the power command value 33, suppress the reverse flow power Pfa, and control the capacitor voltage Vc to be the target voltage VA.

The first power control unit 35 outputs a control command which is basic information of the output power command 31 for the DC/AC converter 13 so that (sale power maximum value−actual sale power), i.e., (PAmax−Pf), which is a value obtained by subtracting actual sale power which is the flow power Pf detected by the flow power detection unit 21 from the sale power maximum value PAmax which is the power command value 33, becomes zero. For example, in the case of (PAmax>Pf), the control command is increased so as to increase discharge power of the power storage device 10. On the other hand, in the case of (PAmax<Pf), the control command is decreased so as to decrease discharge power of the power storage device 10.

In this case, the control command in the first power control unit 35 is generated so as to maximize discharge power of the power storage device 10. This control command is determined without depending on the status of the load 3. When discharge power based on the output power command 31 for the DC/AC converter 13 exceeds load power, reverse flow power flows to the power grid 1 side with respect to the load 3. The second power control unit 36 outputs a control command so as to suppress the reverse flow power Pfa detected by the reverse flow power detection unit 22. By this control command, the output power command 31 for the DC/AC converter 13 is reduced so as to reduce discharge power of the power storage device 10. Then, the output power command 31 becomes a value of load power, and the DC/AC converter 13 supplies only load power to the AC side.

The first voltage control unit 37 generates the output power command 32 for the DC/DC converter 12 so that the voltage Vc of the smoothing capacitor 14 becomes the target voltage VA. As a result, the output power command 32 for the DC/DC converter 12 becomes equal to the output power command 31 for the DC/AC converter 13. At this time, output power of the DC/DC converter 12 and output power of the DC/AC converter 13 are equal to each other, and the capacitor voltage Vc is controlled to be constant at the target voltage VA.

By such control, reverse flow power can be suppressed, and operation can be reliably continued without deviating from the first constraint condition.

In addition, the capacitor voltage Vc can be prevented from deviating from a normal range, and power control can be performed in such a manner that the output power commands 31 and 32 for the DC/AC converter 13 and the DC/DC converter 12 are smoothly changed without influencing the breakdown voltage of an element composing each section of a main circuit in the power control system 100.

Thus, a plurality of operation modes have been described. Shift between these operation modes is performed by only changing the power command value 33 through the same control by the same control device 30. By changing the output power commands 31 and 32 for the DC/AC converter 13 and the DC/DC converter 12 in accordance with the power command value 33, the control device 30 can perform shift between the operation modes without stopping each device or stopping output.

The power control system 100 includes the second voltage control unit 38 separately from the first voltage control unit 37 which controls the voltage Vc of the smoothing capacitor 14 to be the target voltage VA. This second voltage control unit 38 uses two kinds of reference voltages of the upper limit voltage (VA+α) which is higher than the target voltage VA by the predetermined voltage α and the lower limit voltage (VA−α) which is lower than the target voltage VA by the predetermined voltage α, with respect to the voltage Vc of the smoothing capacitor 14. In the case where the capacitor voltage Vc increases, at the time when the capacitor voltage Vc exceeds the upper limit voltage (VA+α), the second voltage control unit 38 starts operation to control the capacitor voltage Vc to be equal to or smaller than the upper limit voltage (VA+α). In the case where the capacitor voltage Vc decreases, at the time when the capacitor voltage Vc becomes smaller than the lower limit voltage (VA−α), the second voltage control unit 38 starts operation to control the capacitor voltage Vc to be equal to or greater than the lower limit voltage (VA−α).

Therefore, oscillation in control or the like due to interference between operation of the first voltage control unit 37 and operation of the second voltage control unit 38 can be prevented, voltage variation in the smoothing capacitor 14 can be reliably suppressed, and the power control system 100 can be reliably operated.

The first voltage control unit 37 includes the limiter 37b to limit the output power command 31 for the DC/DC converter 12, thereby operating the power control system 100 so as to meet the requirement of the power storage device 10. While the output power command 31 is being limited, the second voltage control unit 38 operates to suppress voltage variation in the smoothing capacitor 14, whereby the power control system 100 can reliably continue operation.

Load power of the load 3, generated power of the power generation device 2, and the limit value Lim for charge/discharge power of the power storage device 10 asynchronously vary every moment, and thus the power status frequently varies. In the power control system 100 according to the above embodiment 1, even when the power status frequently varies, the control device 30 properly generates the output power commands 31 and 32 for the DC/AC converter 13 and the DC/DC converter 12, to perform control. Therefore, unnecessary operation stop or time lag does not occur, and it is possible to continue operation without the load 3 or the power grid 1 being influenced by power variation due to a device status.

When the power control system 100 is applied, even if it is necessary to change the operation mode frequently as a result of control of the superior control device 4, the control device 30 properly generates the output power commands 31 and 32 for the DC/AC converter 13 and the DC/DC converter 12, to perform control. Therefore, unnecessary operation stop or time lag does not occur, and it is possible to continue operation without the load 3 or the power grid 1 being influenced by power variation due to a device status.

Although in the above embodiment 1, the power generation device 2 such as a solar battery is connected to the power control system 100, the power generation device 2 may not be connected. In this case, power sale is not performed, so that the operation mode does not become the sale maximum mode.

Embodiment 2

Next, in embodiment 2 of the present invention, application of the plurality of operation modes of the power control system 100 described in the above embodiment 1 will be described.

The operation mode is switched by control of the superior control device 4 as well as by selection according to request from a user of the power control system 100. In the control of the superior control device 4, the operation mode is controlled to be switched so as to contribute to the environment.

In order to perform control for switching the operation mode so as to contribute to the environment, the amount of purchase power is controlled in accordance with the time zone or the season. For example, during the nighttime or the like when power demand decreases, the power storage device 10 is charged in the charge priority mode, and during the daytime or the like when power demand increases, the power storage device 10 is discharged in the purchase suppression mode, to cover load power. Thus, if power in a time zone such as a nighttime when power demand decreases is used as load power in a time zone such as a daytime when power demand increases, it is possible to level power demands among time zones. Thus, the power grid 1 can reduce the amount of power generation in a thermal power plant for coping with power demand variation, and as a result, can reduce the amount of carbon dioxide emission, thereby contributing to the environment.

As such a control method for leveling power demands, two types of methods are provided: a method of the superior control device 4 managing a time schedule such as time zones and seasons, and a method of the superior control device 4 acquiring power demand information.

In the method of managing a time schedule, the superior control device 4 manages a time schedule, and determines the power command value 33 based on a set time schedule. Thus, the operation mode of the power control system 100 is controlled to be switched.

In the case where the power control system 100 includes the superior control device 4 having a function to determine the power command value 33, the power control system 100 can operate alone without depending on the outside.

In the method of acquiring power demand information, the superior control device 4 acquires power demand information from a further superior control system. For example, in the case where the power control system 100 is provided in a home, demand power in a community such as a town or a village which the home belongs to is acquired as the power demand information from the superior control system which manages the demand power in the community. Then, the superior control device 4 determines the power command value 33 in accordance with the acquired demand power. Thus, the operation mode of the power control system 100 is controlled to be switched.

As described in the above embodiment 1, in the power control system 100, even if the power status frequently varies or even if it is necessary to change the operation mode frequently as a result of control by the superior control device 4, unnecessary operation stop or time lag does not occur, and it is possible to continue operation without the load 3 or the power grid 1 being influenced by power variation due to a device status. Therefore, in any of the two types of methods, operation can be continued without unnecessary operation stop or time lag. Particularly, in the method of acquiring power demand information, even if power demand frequently varies, operation of the power control system 100 easily follows actual power demand variation, and the influence on the load 3 or the power grid 1 can be reduced.

Embodiment 3

In the above embodiment 2, the operation mode of the power control system 100 is controlled to be switched so as to contribute to the environment. In embodiment 3, through control by the superior control device 4, the operation mode is controlled to be switched so as to increase the benefit of a user.

Figure 8:
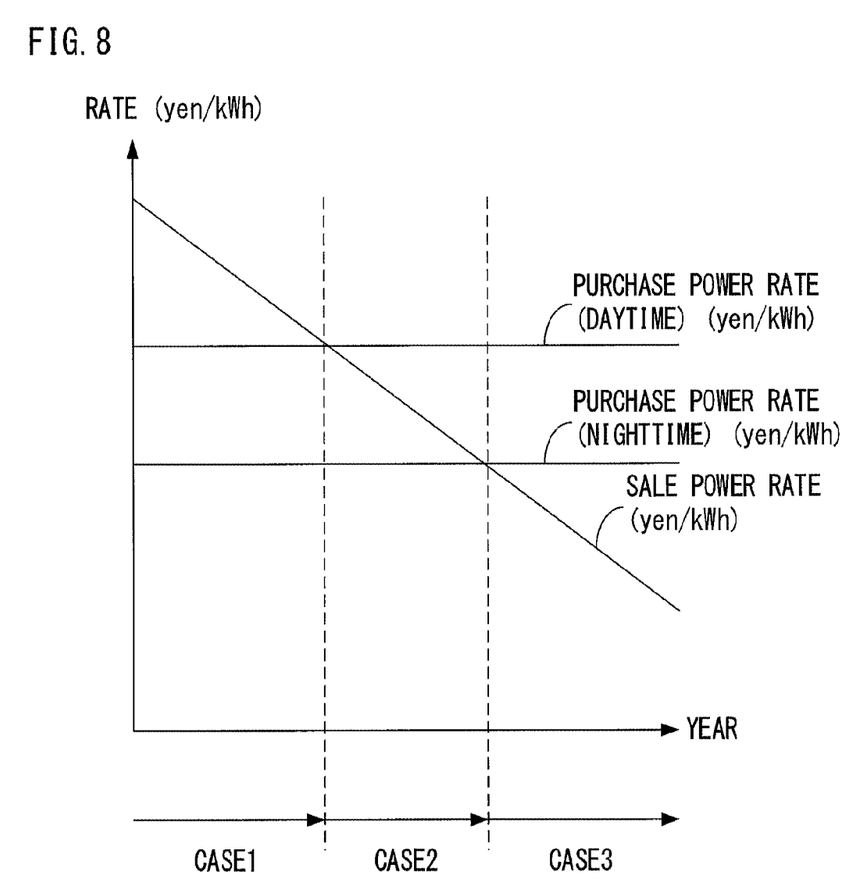
FIG. 8 is an electric rate applied to a power control system according to embodiment 2 of the present invention.

FIG. 8 is a diagram showing an electric rate applied to the power control system 100 according to embodiment 3.

An electric rate structure changes every moment. As shown in FIG. 8, the following three cases will be assumed as a magnitude relationship among electric rate types.

CASE 1: sale electric rate>purchase electric rate (daytime)>purchase electric rate (nighttime)

CASE 2: purchase electric rate (daytime)>sale electric rate>purchase electric rate (nighttime)

CASE 3: purchase electric rate (daytime)>purchase electric rate (nighttime)>sale electric rate In embodiment 3, the superior control device 4 acquires electric rate information, and based on the rate information, determines the power command value 33 so as to switch the operation mode as described below.

In CASE 1 and CASE 2, during the nighttime when the rate is low, the power control system 100 is operated in the charge priority mode, to charge the power storage device 10. During the daytime, the power control system 100 is operated in the sale maximum mode, to sell the whole generated power of the power generation device 2 while fully covering load power during the daytime by discharge power from the power storage device 10, without purchasing power. Thus, a user can obtain the maximum benefit. In such a case where a difference between a sale rate and a purchase rate for the power generation device 2 is small, load power during the daytime may be fully covered by discharge power from the power storage device 10 and generated power of the power generation device 2, without purchase of power, and only surplus generated power may be sold, whereby a user can also obtain a benefit.

In CASE 3, during the nighttime, the power control system 100 is operated in the charge priority mode, to charge the power storage device 10. During the daytime, the power control system 100 is operated in the purchase minimum mode, to fully cover load power during the daytime by discharge power from the power storage device 10 and generated power from the power generation device 2, without purchasing power. Thus, a user can obtain the maximum benefit.

In CASE 3, when (generated power>load power) is satisfied due to variation in generated power of the power generation device 2 or variation in load power, the surplus power is charged in the power storage device 10. In the power control system 100, even when the power status varies, stop of system operation or time lag does not occur, and charge and discharge of the power storage device 10 can be continuously switched. Therefore, it is possible to perform power flow control without influencing stability of the power grid 1 or the operation status of the load 3, while a user can obtain the maximum benefit.

The superior control device 4 may selectively use either one of a first mode in which the operation mode is controlled to be switched so as to contribute to the environment as described in the above embodiment 2, and a second mode in which the operation mode is controlled to be switched so as to increase the benefit of a user as described in the present embodiment 3. In this case, the superior control device 4 may have a function to switch between the first mode and the second mode in accordance with an external input, and a user of the power control system 100 may be allowed to perform the switching.

It is noted that, within the scope of the present invention, the above embodiments may be freely combined with each other, or each of the above embodiments may be modified or abbreviated as appropriate.

The invention claimed is:
1. A power control system comprising:
a DC/DC converter having a first input/output side connected to a power storage device and causing the power storage device to be charged or discharged through a bidirectional DC/DC power conversion operation;
a DC/AC converter having a DC side connected to a second input/output side of the DC/DC converter and an AC side connected to a power grid, and performing bidirectional power conversion operation between DC and AC;
a power smoothing element connected between the second input/output side of the DC/DC converter and the DC side of the DC/AC converter;
a flow power sensor for detecting flow power of the power grid;
a reverse flow power sensor for detecting reverse flow power flowing to the power grid, on the power grid side with respect to a load connected between the DC/AC converter and the power grid; and
a control device for performing output control of the DC/DC converter and the DC/AC converter based on a command value for the flow power from the power grid, which is a given power command value, and on a result of detection by the flow power sensor and the reverse flow power sensor, wherein
the control device includes:
  a power controller that generates a first output power command for the DC/AC converter, the power controller including a first power controller that controls the flow power from the power grid so as to follow the power command value, and a second power controller that controls the reverse flow power so as to be suppressed;
  a first voltage controller that generates a second output power command for the DC/DC converter so that voltage of the power smoothing element becomes target voltage; and
  a second voltage controller that corrects the first output power command so as to suppress voltage variation in the power smoothing element.

2. The power control system according to claim 1, wherein, using upper limit voltage which is higher than the target voltage for the power smoothing element and lower limit voltage which is lower than the target voltage for the power smoothing element, the second voltage controller,
  when the voltage of the power smoothing element exceeds the upper limit voltage, corrects the first output power command so that the voltage of the power smoothing element becomes equal to or smaller than the upper limit voltage, and
  when the voltage of the power smoothing element becomes smaller than the lower limit voltage, corrects the first output power command so that the voltage of the power smoothing element becomes equal to or greater than the lower limit voltage.

3. The power control system according to claim 2, wherein
  the first voltage controller has a limiter for limiting the second output power command to a limit value set for charge and discharge of the power storage device,
  the second voltage controller operates only when the voltage of the power smoothing element deviates from a voltage range not lower than the lower limit voltage and not higher than the upper limit voltage, and
  the second voltage controller operates in a state in which the second output power command is limited by the limiter.

4. The power control system according to claim 3, wherein
  a power generation device is interconnected to the power grid, on the power grid side with respect to the reverse flow power sensor, and
  by performing the output control of the DC/DC converter and the DC/AC converter, the control device controls the flow power from the power grid and controls charge and discharge of the power storage device, to supply power to the load and use generated power of the power generation device.

5. The power control system according to claim 4, wherein
  even when the power command value changes, the control device performs the output control of the DC/DC converter and the DC/AC converter through the same control operation, whereby
  the power control system operates while automatically switching among a plurality of operation modes of: a first operation mode in which, in accordance with the power command value, the flow power from the power grid is maximized and the power storage device is charged; a second operation mode in which the flow power is suppressed and the power storage device is charged or discharged; and a third operation mode in which, with the flow power controlled to be negative, the generated power of the power generation device is supplied to the power grid and the power storage device is discharged.

6. The power control system according to claim 4, wherein
  the power command value is determined so as to level the flow power from the power grid between a nighttime and a daytime.

7. The power control system according to claim 2, wherein
  a power generation device is interconnected to the power grid, on the power grid side with respect to the reverse flow power sensor, and
  by performing the output control of the DC/DC converter and the DC/AC converter, the control device controls the flow power from the power grid and controls charge and discharge of the power storage device, to supply power to the load and use generated power of the power generation device.

8. The power control system according to claim 7, wherein
  even when the power command value changes, the control device performs the output control of the DC/DC converter and the DC/AC converter through the same control operation, whereby
  the power control system operates while automatically switching among a plurality of operation modes of: a first operation mode in which, in accordance with the power command value, the flow power from the power grid is maximized and the power storage device is charged; a second operation mode in which the flow power is suppressed and the power storage device is charged or discharged; and a third operation mode in which, with the flow power controlled to be negative, the generated power of the power generation device is supplied to the power grid and the power storage device is discharged.

9. The power control system according to claim 7, wherein
  the power command value is determined so as to level the flow power from the power grid between a nighttime and a daytime.

10. The power control system according to claim 7, further comprising a command value generator that determines the power command value, wherein
  the command value generator selectively uses either one of a first mode in which the power command value is determined based on a set time schedule, and a second mode in which the power command value is determined in accordance with an electric rate.

11. The power control system according to claim 7, further comprising a command value generating unit for determining generator that determines the power command value, wherein
the command value generator selectively uses either one of a first mode in which the power command value is determined based on power demand information, and a second mode in which the power command value is determined in accordance with an electric rate.

12. The power control system according to claim 1, wherein
a power generation device is interconnected to the power grid, on the power grid side with respect to the reverse flow power sensor, and
by performing the output control of the DC/DC converter and the DC/AC converter, the control device controls the flow power from the power grid and controls charge and discharge of the power storage device, to supply power to the load and use generated power of the power generation device.

13. The power control system according to claim 12, wherein
even when the power command value changes, the control device performs the output control of the DC/DC converter and the DC/AC converter through the same control operation, whereby
the power control system operates while automatically switching among a plurality of operation modes of: a first operation mode in which, in accordance with the power command value, the flow power from the power grid is maximized and the power storage device is charged; a second operation mode in which the flow power is suppressed and the power storage device is charged or discharged; and a third operation mode in which, with the flow power controlled to be negative, the generated power of the power generation device is supplied to the power grid and the power storage device is discharged.

14. The power control system according to claim 12, wherein
the power command value is determined so as to level the flow power from the power grid between a nighttime and a daytime.

15. The power control system according to claim 12, further comprising a command value generator that determines the power command value, wherein
the command value generator selectively uses either one of a first mode in which the power command value is determined based on a set time schedule, and a second mode in which the power command value is determined in accordance with an electric rate.

16. The power control system according to claim 12, further comprising a command value generator that determines the power command value, wherein
the command value generator selectively uses either one of a first mode in which the power command value is determined based on power demand information, and a second mode in which the power command value is determined in accordance with an electric rate.

* * * * *